(No Model.)

F. MOORE.
TRIPLE VALVE FOR AUTOMATIC BRAKE MECHANISM.

No. 435,763. Patented Sept. 2, 1890.

WITNESSES:
R. H. Whittlesey
F. E. Gaither

INVENTOR,
Frank Moore
By J. Snowden Bell,
Att'y.

THE NORRIS PETERS CO., PHOTO-LITHO., WASHINGTON, D. C.

UNITED STATES PATENT OFFICE.

FRANK MOORE, OF PITTSBURG, PENNSYLVANIA, ASSIGNOR TO THE WESTINGHOUSE AIR BRAKE COMPANY, OF SAME PLACE.

TRIPLE VALVE FOR AUTOMATIC BRAKE MECHANISM.

SPECIFICATION forming part of Letters Patent No. 435,763, dated September 2, 1890.

Application filed February 15, 1890. Serial No. 340,575. (No model.)

*To all whom it may concern:*

Be it known that I, FRANK MOORE, a citizen of the United States, residing at Pittsburg, in the county of Allegheny and State of Pennsylvania, have invented or discovered a certain new and useful Improvement in Triple Valves for Automatic Brake Mechanisms, of which improvement the following is a specification.

My invention relates to appliances of the class known as "triple valves," which are employed in automatic brake apparatus to effect and control the admission of air under pressure from a main air or train pipe to an auxiliary reservoir and from the auxiliary reservoir to a brake-cylinder and the exhaust of air from the brake-cylinder, in order to apply and release the brakes, as from time to time required, by the reduction and increase, respectively, of pressure in the main air or train pipe.

The object of my invention is to provide a simple and effective triple valve, in the operation of which quicker action shall be attained than under the ordinary construction and waste of air under pressure prevented by the preliminary delivery of air from the main air or train-pipe to the brake-cylinder and its utilization to act upon the piston thereof in each and every application of the brakes, whether the same be made with a greater or less degree of force, and which also will admit of a graduated discharge of air from the brake-cylinder after the application of the brakes in order that they may be held to the wheels under such degree of pressure less than the maximum as may be desired.

To this end my invention, generally stated, consists in the combination of a casing, a movable abutment working therein, and a supply-valve actuated by said abutment and controlling, preliminarily, in the application of the brakes communication between a main air or train pipe and a brake-cylinder, and, secondarily, communication between an auxiliary reservoir and the brake-cylinder.

The improvement claimed is hereinafter fully set forth.

Figure 1:
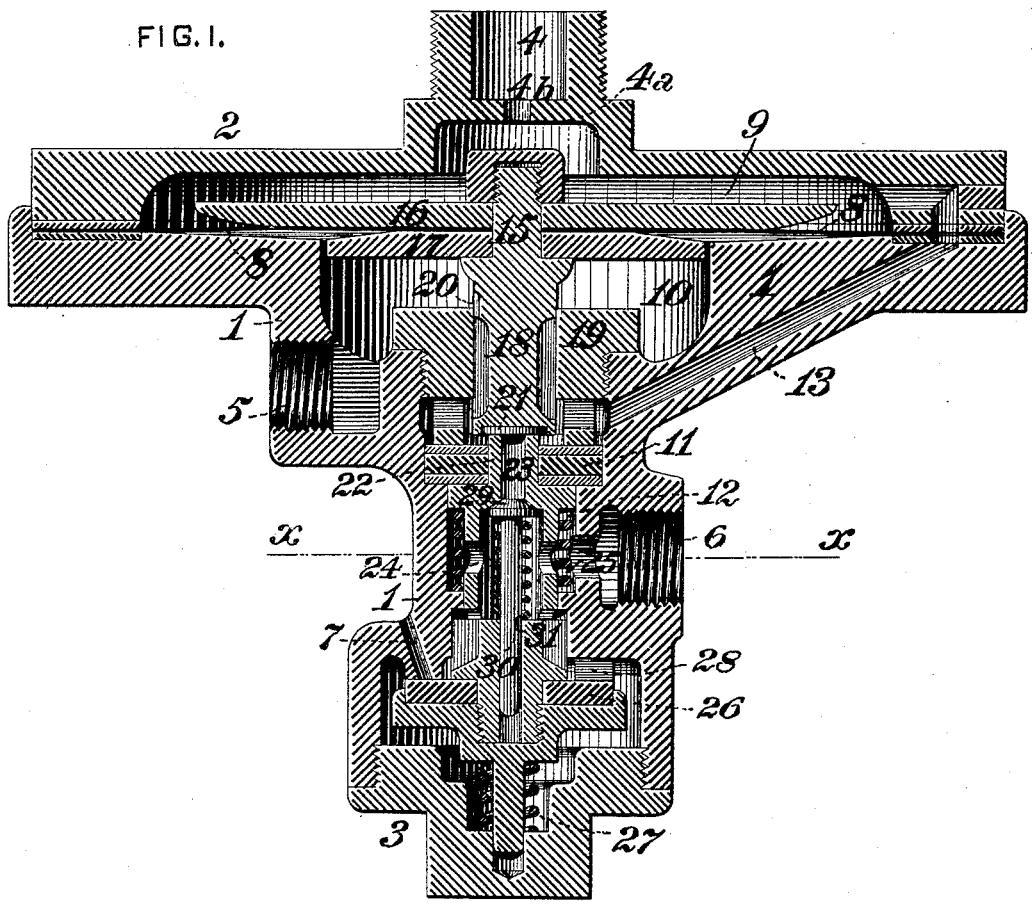
Figure 2:
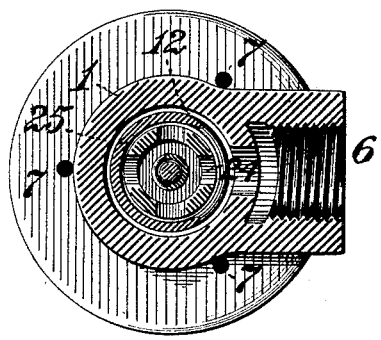

In the accompanying drawings, Figure 1 is a longitudinal central section through a triple valve embodying my invention, and Fig. 2 a transverse section through the same at the line $x\,x$ of Fig. 1.

In the practice of my invention I provide a valve-casing composed of a body 1, a cap-plate 2, and a bottom plate 3, which are suitably secured together, making tight joints. A nozzle 4 is formed upon the cap-plate 2 for the connection of a pipe leading to the main air or train pipe, and the body 1 is provided at different points in its lengths with lateral nozzles or threaded passages 5 6 for the connection of pipes leading to an auxiliary reservoir and to a brake-cylinder, respectively. Exhaust ports or passages 7, leading from the interior of the body 1 to the atmosphere, are also formed in the body below the brake-cylinder connection 6. A partition $4^a$, in which is formed a central opening $4^b$, of smaller diameter than the bore of the nozzle 4, extends across the same adjacent to the cap-plate 2, in order to effect a restriction of the passage for the traverse of air through the same, the opening $4^b$ being slightly greater in diameter than that through which air passes from the supply-valve 18, hereinafter specified, to the brake-cylinder.

The interior of the valve-casing is divided by a movable abutment 8, which is preferably, as shown, a flexible diaphragm, secured at and near its periphery between the cap-plate and the adjacent face of the body into two chambers or compartments 9 10, one of which 9 communicates with the main air or train pipe connection 4, and the other 10, which is located within the body 1, communicates with the auxiliary-reservoir connection 5. A partition 11, having a central opening and secured in the body 1 at the lower end of the compartment 10 by a screwed bushing 19, separates the compartment 10 from a chamber or compartment 12 located below it, said compartment 12 communicating with the brake-cylinder connection 6 and exhaust-passages 7. Communication is established between the main air or train pipe connection 4 and chamber 9 and the chamber 10 by a passage 13 extending through the cap-plate and shell of the body and through the diaphragm.

A stem 15 is secured centrally to the movable abutment 8 and to stiffening-plates 16 17 on opposite sides thereof, said stem carrying a supply-valve 18, having an upper piston adapted to fit closely in the bushing 19, which closes the lower end of the chamber 10, and to thereby close communication between the auxiliary-reservoir connection 5 and the passage 13, leading to the train-pipe connection, except in so far as is permitted by a small lateral charging-groove 20 cut in one side of the valve-piston. The valve 18 is reduced in diameter below its piston and provided with lateral guiding-wings fitting in the bushing, and its lower end is provided with a face 21, adapted to seat accurately upon the upper end of a stem 22, passing through the partition 11, and having a central bore or passage 23, which is of slightly smaller diameter than the restrictive passage $4^b$ of the main air or train pipe connection, and which is open at its end adjoining the valve-face, and communicates by lateral passages 24 with the chamber 12 and brake-cylinder connection 6. The stem 22 is provided with a shoulder which abuts against the partition 11, and is normally held in contact therewith and in position for the closing of the passage 23 by the valve-face 21 by a spring 25. The lower end of the chamber 12 and the brake-cylinder connection 6 are normally closed to the atmosphere by a flat discharge-valve 26, which is held up to a series of faces at the lower end of the chamber 12, from which faces the exhaust-passages 7 lead to the atmosphere by a spring 27. Equilibrium of pressure on opposite sides of the discharge-valve 26 is maintained by lateral passages 28, located between the faces at the lower ends of the exhaust-passages 7. The lower end of the stem 22 closely adjoins without exerting bearing-pressure against the valve 26, when the stem and valve are normally seated by the springs 25 and 27. A check or non-return valve 29, fixed upon a stem 30, guided centrally in the upper section of the discharge-valve 26 and opening downwardly or in the direction of the brake-cylinder connection 6, is held normally seated in the central bore 23 of the stem 22, between the upper end of the same and the brake-cylinder connection, by a light spring 31, said valve being provided to prevent the return of air from the main or train cylinder to the brake-pipe in the event of the rupture of the latter.

In operation air under pressure passes from the main air or train pipe through the nozzle 4 and passage $4^b$, chamber 9 and passage 13 into the chamber 10, below the piston of the supply-valve 18, and passes through the charging-groove 20 and nozzle 5 to the auxiliary reservoir, charging the latter and the chamber 10 to a pressure equal to that in the main air or train pipe. The passage 23 being meanwhile closed by the valve-face 21, air is prevented from passing to the brake-cylinder connection 6. To effect the application of the brakes, the engineer reduces the pressure in the main air or train pipe by discharging air therefrom through the valve on the engine, and the then greater pressure in the auxiliary reservoir raises the movable abutment 8 and valve 18, thereby unseating the valve-piston from the bushing 19 and the valve-face 21 from the opening of the passage 23. The passage 23 being, as before specified, of slightly smaller diameter than the restricted passage $4^b$ of the main air or train pipe connection 4, and there being less resistance in the direction of the brake-cylinder connection than in the direction of the main air or train pipe, a difference of pressure is instituted on opposite sides of the partition $4^a$ and a flow of air is preliminarily induced from the main air or train pipe to the brake-cylinder through the passages 13 and 23, the check-valve 29 being unseated by the pressure above it. In addition to the utilization of the air thus admitted from the main air-pipe in the application of the brakes by the exertion of its pressure in the brake-cylinder, increased rapidity in the application of the brakes of the succeeding cars of the train is attained by the more rapid reduction of pressure upon the abutments of their triple valves than would be caused if air was discharged from the main air or train pipe only at the valve on the engine. A very slight discharge of air from the engineer's valve and a consequent slight reduction of pressure in the main air or train pipe will suffice to actuate the first triple valve of the train, and the air withdrawn from the main air or train pipe by said valve effects the reduction of pressure by which the remaining triple valves on the train are actuated in such close succession that their operation is practically simultaneous. The economization of air and rapid action thus attained are, as will be readily seen, of material advantage in practical railway-service. The further upward traverse of the supply-valve 18 admits air secondarily from the auxiliary reservoir through the chamber 10, passages 23 and 24, chamber 12, and connection 6 to the brake-cylinder, the pressure of the air admitted, as above described, applying the brakes through the piston of the brake-cylinder and the usual connections. The release of the brakes is effected by restoring the pressure in the main air or train pipe, such restoration of pressure moving the abutment 8 and supply-valve 18 downwardly and primarily closing communication between the main air or train pipe and the auxiliary reservoir (except so far as is permitted by the charging-groove 20) by the piston of the supply-valve, and between the main air or train pipe and auxiliary reservoir and the brake-cylinder by the piston of the supply-valve and by its lower face 21. The continued downward movement of the abutment under the action of the restored pressure in the main air or train pipe and connected chamber 9 forces the stem 22 downwardly, and through said stem unseats the discharge-valve 26, thereby establishing communication between the brake-cylinder connection 6 and exhaust-passages 7, and releasing the brakes by permitting the air to be discharged from the brake-cylinder. The check-valve 29, which is normally seated, prevents the escape of air from the brake-cylinder to the main air or train pipe in the event of the rupture of the main air or train pipe or its separation by the breaking in two of the train. If it be desired to graduate the application of the brakes or to hold them applied to the wheels under a degree of pressure less than that originally imparted, a greater or less degree of air, as desired, may be discharged from the brake-cylinder without completely releasing the brakes. This end is attained by imparting a greater or less degree of opening, as may be required, to the discharge-valve 26 by a partial restoration of pressure in the main air or train pipe, and thereafter cutting off the supply to the main air or train pipe, when the pressure on opposite sides of the movable abutment is equalized by the passage of air through the feeding-groove to the auxiliary reservoir, and the springs 25 and 27 return the stem 22 and discharge-valve 26 to normal position, thereby reseating the discharge-valve and cutting off the exhaust of air from the brake-cylinder. It will be obvious that the brakes may be originally applied with greater or less force, as required, by a correspondingly greater or less degree of reduction of pressure in the main air or train pipe.

A supply-valve actuated by a movable abutment and controlling communication between a main air or train pipe connection and an auxiliary-reservoir connection and between the auxiliary-reservoir connection and a brake-cylinder connection and an independent discharge-valve controlling communication between the brake-cylinder connection and an exhaust-passage are set forth under substantially similar structural and operative conditions to those herein described, saving as to the preliminary and direct admission of air from the main air-pipe to the brake-cylinder, in an application for Letters Patent filed by me January 2, 1890, Serial No. 335,620, and the same are not therefore claimed, either singly or collectively, as of my present invention.

I claim as my invention and desire to secure by Letters Patent—

1. The combination of a valve-casing, a movable abutment working therein, and a single valve actuated by said abutment and directly controlling the passage of air to a brake-cylinder both from a main air or train pipe and from an auxiliary reservoir, substantially as set forth.

2. The combination of a valve-casing, a movable abutment working therein, and a supply-valve actuated by said abutment and controlling, preliminarily, in the application of the brakes communication between a main air or train pipe and a brake-cylinder, and, secondarily, communication between an auxiliary reservoir and the brake-cylinder, substantially as set forth.

3. The combination of a valve-casing, a movable abutment working therein, a supply-valve connected to and actuated by said abutment, a continuously open-passage leading from a main air or train pipe connection to a chamber in which said valve is normally seated and to an auxiliary-reservoir connection, a passage leading from the seat of said valve to a brake-cylinder connection, and an auxiliary-reservoir connection which communicates freely with the valve-chamber and brake-cylinder connection by the unseating and traverse of the supply-valve, substantially as set forth.

4. The combination of a valve-casing, a movable abutment working therein, a main air or train pipe connection leading into the casing on one side of the abutment and communicating therewith through a reduced or restricted passage, a supply-valve connected to and actuated by the movable abutment, a passage leading from the side of the abutment which adjoins the brake-cylinder connection to a chamber in which the supply-valve is normally seated, a passage leading from the seat of said valve to a brake-cylinder connection, and an auxiliary-reservoir connection which communicates freely with the valve-chamber and brake-cylinder connection by the unseating and traverse of the supply-valve, substantially as set forth.

5. The combination of a valve-casing, a movable abutment working therein, a supply-valve connected to and actuated by said abutment, a continuously-open passage leading from a main air or train pipe connection to a chamber in which said valve is normally seated, a passage which is of slightly-reduced diameter relatively to that through which the traverse of air between the main air or train pipe and the casing is effected, and which leads from the seat of the supply-valve to a brake-cylinder connection, and an auxiliary-reservoir connection which communicates freely with the valve-chamber and brake-cylinder connection by the unseating and traverse of the supply-valve, substantially as set forth.

6. The combination of a valve-casing, a movable abutment working therein, a supply-valve actuated by said abutment and controlling communication between a main air or train pipe connection and a brake-cylinder connection between a main air or train pipe connection and an auxiliary-reservoir connection and between the auxiliary-reservoir connection and the brake-cylinder connection, and an independent discharge-valve controlling communication between the brake-cylinder connection and an exhaust-passage, substantially as set forth.

7. The combination of a valve-casing, a movable abutment working therein, a supply-valve connected to and actuated by said abutment and controlling a passage from an auxiliary reservoir to a brake-cylinder, and a continuously-open passage leading from a main air or train pipe to an auxiliary-reservoir connection, substantially as set forth.

8. The combination of a valve-casing, a movable abutment working therein, a supply-valve connected to and actuated by said abutment and controlling a passage from a main air or train pipe and an auxiliary reservoir to a brake-cylinder, and a continuously-open passage leading from a main air or train pipe to an auxiliary-reservoir connection, substantially as set forth.

In testimony whereof I have hereunto set my hand.

FRANK MOORE.

Witnesses:
J. SNOWDEN BELL,
R. H. WHITTLESEY.